(12) United States Patent
Fukamachi et al.

(10) Patent No.: US 6,405,823 B1
(45) Date of Patent: Jun. 18, 2002

(54) VEHICLE POWER UNIT

(75) Inventors: Masatoshi Fukamachi; Shin Nabeya, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/635,687

(22) Filed: Aug. 10, 2000

(30) Foreign Application Priority Data

Aug. 10, 1999 (JP) .......................................... 11-226317

(51) Int. Cl.[7] ................................................ B60K 5/04
(52) U.S. Cl. ........................................ 180/297; 180/217
(58) Field of Search ................................ 180/215, 219, 180/231, 297, 350, 357, 299, 349, 217

(56) References Cited

U.S. PATENT DOCUMENTS

| | | | |
|---|---|---|---|
| 3,504,934 A | * | 4/1970 | Wallis ..................... 180/217 X |
| 4,429,760 A | * | 2/1984 | Koizumi et al. ............ 180/215 |
| 4,448,279 A | * | 5/1984 | Watanabe et al. ........... 180/297 |
| 4,712,629 A | * | 12/1987 | Takahashi et al. ....... 180/217 X |
| 4,995,417 A | * | 2/1991 | Hara et al. ............. 180/68.3 X |

FOREIGN PATENT DOCUMENTS

| | | |
|---|---|---|
| JP | U6254891 | 4/1987 |
| JP | Y2-6223349 | 6/1987 |

* cited by examiner

*Primary Examiner*—Michael Mar
(74) *Attorney, Agent, or Firm*—Birch, Stewart, Kolasch & Birch, LLP

(57) ABSTRACT

To suppress vibrations of a power unit which is vertically swingably supported to a vehicle body, thereby suppressing the generation of noise. A vehicle power unit includes an internal combustion engine having a cylinder portion with axis L which is inclined down to the rear side from a vertical direction, and a power transmitting device for transmitting power of the engine to a rear wheel WR. The power unit is supported at a front pivot portion and a rear pivot portion to a vehicle body so as to be vertically swingable about the front pivot portion. A crankshaft and an axle of the rear wheel are located below a plane containing the axes of the front pivot portion and the rear pivot portion. The plane and the cylinder portion intersect each other between the front pivot portion and the rear pivot portion as viewed in side elevation.

10 Claims, 4 Drawing Sheets

VEHICLE POWER UNIT

BACKGROUND OF THE INVENTION

1. Field of the Invention

The present invention relates to a power unit mounted on a vehicle such as a three-wheeled automotive vehicle and including an internal combustion engine and a power transmitting device for transmitting power of the internal combustion engine to a drive wheel. More particularly, the present invention relates to an arrangement of the internal combustion engine and a pivot portion for swingably supporting the power unit to a vehicle body.

2. Description of Background Art

A conventional vehicle power unit includes an internal combustion engine and a power transmitting device which is supported on a vehicle body at a front pivot portion and a rear pivot portion spaced from each other in a longitudinal direction of the vehicle body so as to be vertically swingable about the front pivot portion.

For example, a power unit mounted on a motorcycle described in Japanese Utility Model Publication No. Sho 62-23349 includes an internal combustion engine having a cylinder portion inclined down to the rear side from a vertical direction. The cylinder portion and a crankshaft of the engine are located above a plane containing the axes of a front pivot portion and a rear pivot portion for pivotably supporting the power unit to a vehicle body.

Another power unit mounted on a three-wheeled automotive vehicle described in Japanese Utility Model Laid-open No. Sho 62-54891 includes an internal combustion engine having a cylinder portion inclined down to the front side from a vertical direction. A crankshaft of the engine is located below a plane containing the axes of a front pivot portion and a rear pivot portion for pivotably supporting the power unit to a vehicle body.

In the former prior art power unit, the crankshaft and the cylinder portion of the engine are located above the plane, and the cylinder portion largely projects upward from the plane. Accordingly, the moment of inertia of the cylinder portion about a straight line lying on the plane and connecting the lateral center of the front pivot portion and the lateral center of the rear pivot portion is large. As a result, a large moment about the straight line acts on the front pivot portion and the rear pivot portion of the power unit because of vibrations of the cylinder portion by the combustion in the engine. Therefore, the power unit including the cylinder portion tends to vibrate about the straight line, causing the generation of noise.

In the latter prior art power unit, the crankshaft of the engine is located below the plane, and the cylinder portion is inclined down to the front side from the vertical direction. Accordingly, the cylinder portion largely projects upward from the plane. Therefore, the power unit including the cylinder portion tends to vibrate as in the former case, causing the generation of noise.

SUMMARY OF THE INVENTION

It is accordingly an object of the present invention to suppress vibrations of a power unit which is vertically swingably supported to a vehicle body, thereby suppressing the generation of noise.

In accordance with a first aspect of the present invention, there is provided a vehicle power unit including an internal combustion engine having a crankshaft extending in a lateral direction of a vehicle body and a cylinder portion having an axis which is inclined down to the rear side from a vertical direction, and a power transmitting device for transmitting power of the internal combustion engine to a rear wheel located behind the crankshaft, the vehicle power unit being supported to the vehicle body at a front pivot portion and a rear pivot portion spaced from each other in a longitudinal direction of the vehicle body so as to be vertically swingable about the front pivot portion; wherein the crankshaft and an axle of the rear wheel are located below a plane containing the axes of the front pivot portion and the rear pivot portion, and the plane and the cylinder portion intersect each other between the front pivot portion and the rear pivot portion as viewed in side elevation.

With this arrangement, the plane is located above the crankshaft and the axle of the rear wheel, and the plane and the cylinder portion having an axis which is inclined down to the rear side intersect each other between the front pivot portion and the rear pivot portion. Accordingly, the amount of upward projection of the cylinder portion from the plane can be reduced.

As a result, it is possible to reduce the moment of inertia of the cylinder portion about a straight line lying on the plane and connecting the lateral center of the front pivot portion and the lateral center of the rear pivot portion. Therefore, it is possible to reduce the moment acting on the front pivot portion and the rear pivot portion due to vibrations of the cylinder portion by the combustion in the internal combustion engine. Accordingly, vibrations of the power unit including the cylinder portion can be suppressed to thereby suppress the generation of noise.

In accordance with a second aspect of the present invention, the power transmitting device includes a transmission having an output shaft geared to the axle of the rear wheel, the output shaft being located below a part of the cylinder portion so as to be vertically overlapped and below a plane containing the axis of the crankshaft and the axis of the axle of the rear wheel.

With this arrangement, the output shaft of the transmission geared to the axle of the rear wheel is located below the plane containing the axis of the crankshaft and the axis of the axle of the rear wheel. Accordingly, the cylinder portion vertically overlapped with the output shaft can be further inclined down to the rear side without the interference with the output shaft.

As a result, it is possible to increase the degree of freedom of tilt arrangement of the cylinder portion for reducing the amount of upward projection of the cylinder portion from the plane containing the axis of the front pivot portion and the axis of the rear pivot portion. Accordingly, optimum arrangement of the cylinder portion with respect to the plane containing the axis of the front pivot portion and the axis of the rear pivot portion is allowed from the viewpoint of suppression of vibrations of the power unit.

Furthermore, since the output shaft is located below the cylinder portion so as to be vertically overlapped, the vertical and longitudinal sizes of the power unit can be reduced, so that the power unit can be made compact.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

In this specification, the terms "front, rear, left, and right" refer to the front, rear, left, and right sides of a vehicle body with respect to a vehicle running direction. Furthermore, the terms "cylinder portion" refers to a portion of an internal combustion engine composed of a cylinder, a cylinder head, and a cylinder head cover when the engine has the cylinder head cover, or refers to a portion of an internal combustion engine composed of a cylinder and a cylinder head when the engine has no cylinder head cover.

Figure 1:
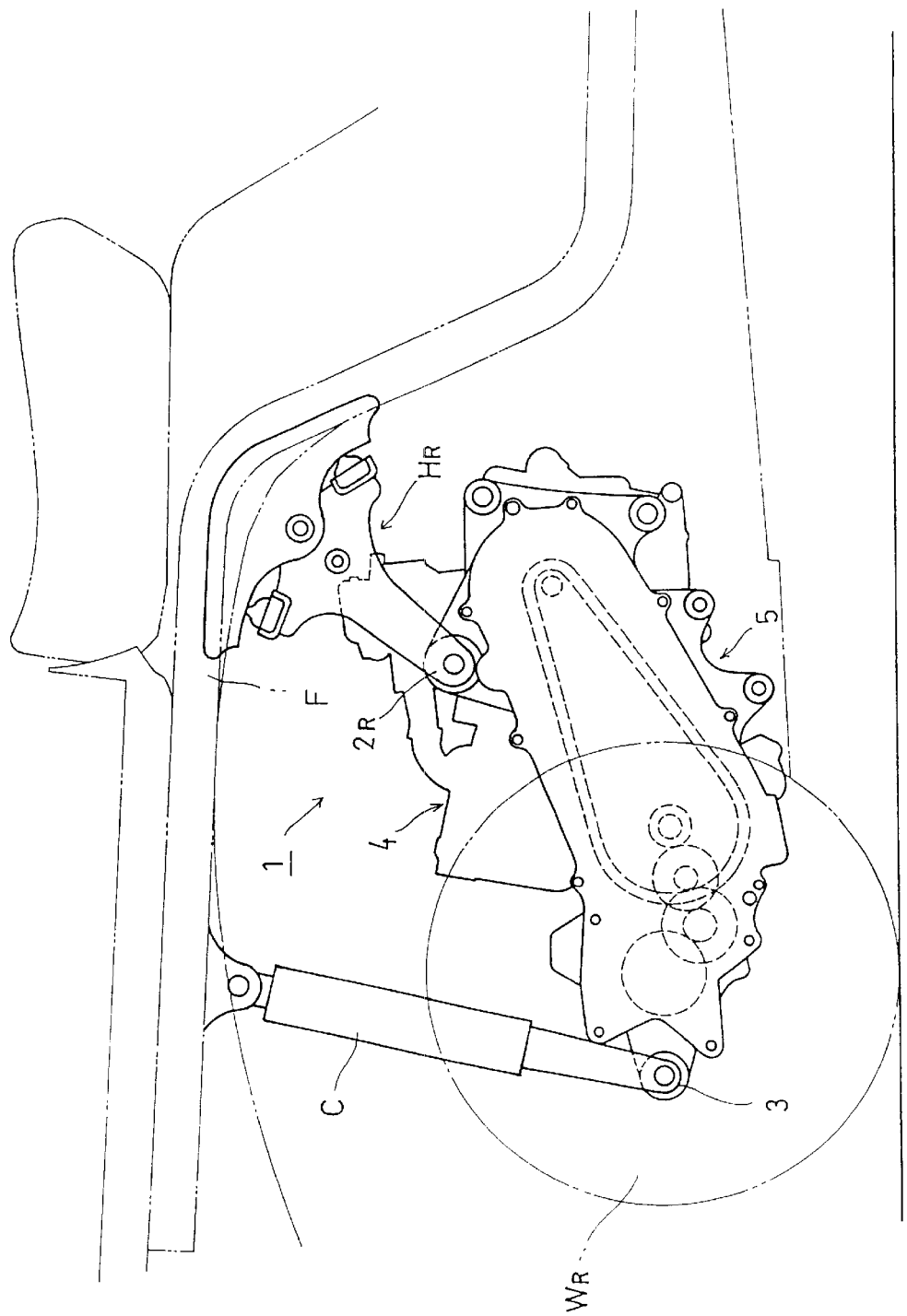
FIG. 1 is a schematic right side view of a rear portion of a three-wheeled automotive vehicle on which a vehicle power unit according to the present invention is mounted.

A preferred embodiment of the present invention will now be described with reference to FIGS. 1 to 4. FIG. 1 is a schematic right side view of a rear portion of a three-wheeled automotive vehicle having one front wheel and two left and right rear wheels $W_L$ and $W_R$ (see FIG. 3) as drive wheels. As shown in FIG. 1, a vehicle power unit 1 is mounted on the rear portion of the three-wheeled automotive vehicle. A pair of left and right engine hanger links (only the right engine hanger link $H_R$ is shown in FIG. 1) extend from a frame F forming a vehicle body of the three-wheeled automotive vehicle. A front portion of the power unit 1 is supported at a pair of left and right front pivot portions $2_L$ and $2_R$ to the left and right engine hanger links $H_L$ and $H_R$, and a rear portion of the power unit 1 is supported at a rear pivot portion 3 through a cushion or shock absorber C to the frame F. Thus, the power unit 1 is vertically swingable about the front pivot portions $2_L$ and $2_R$ with respect to the vehicle body. The front pivot portions $2_L$ and $2_R$ and the rear pivot portion 3 will be hereinafter described.

Figure 2:
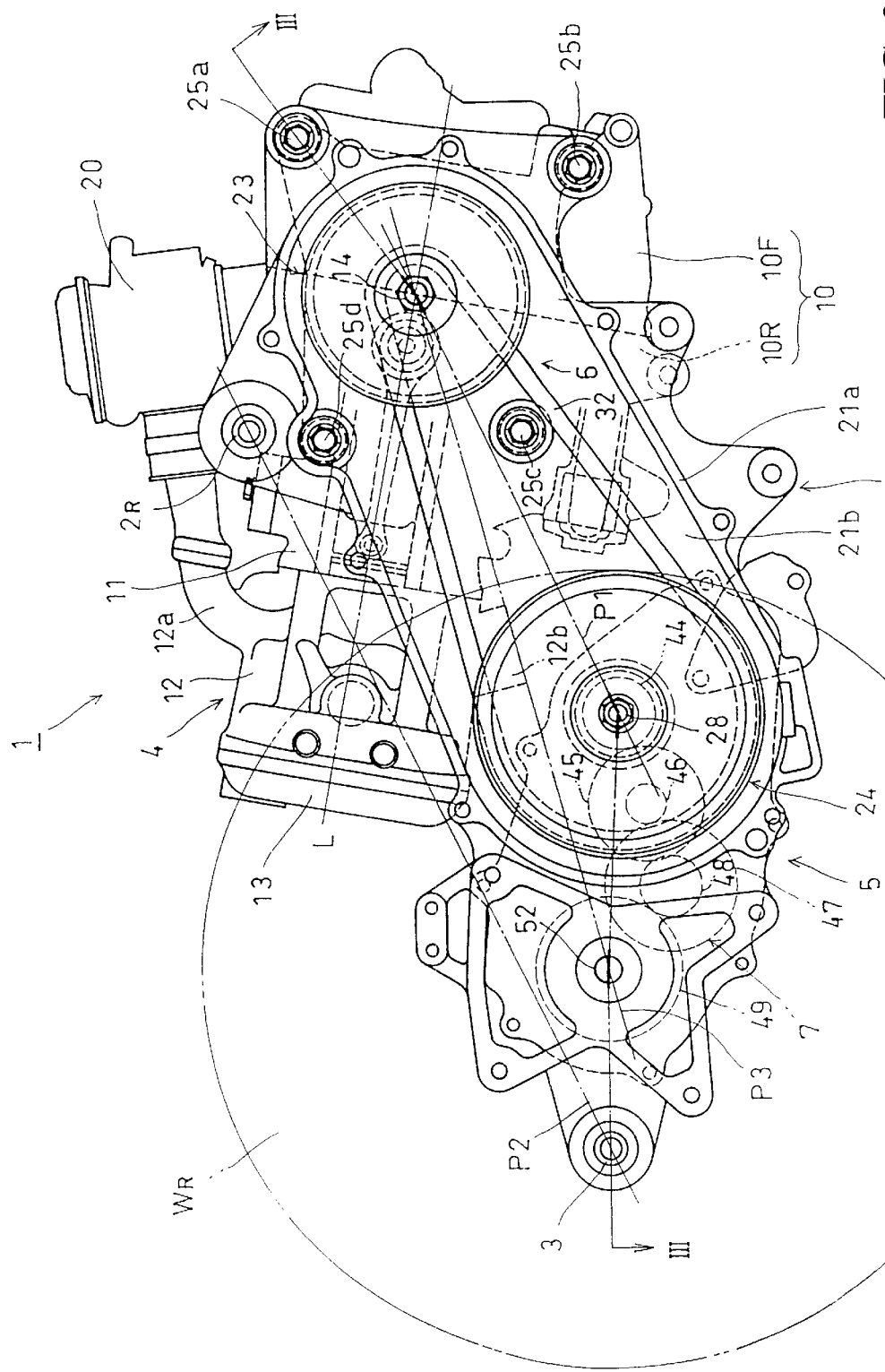
FIG. 2 is a right side view of the vehicle power unit shown in FIG. 1 in the condition where a transmission case cover is removed.
Figure 3:
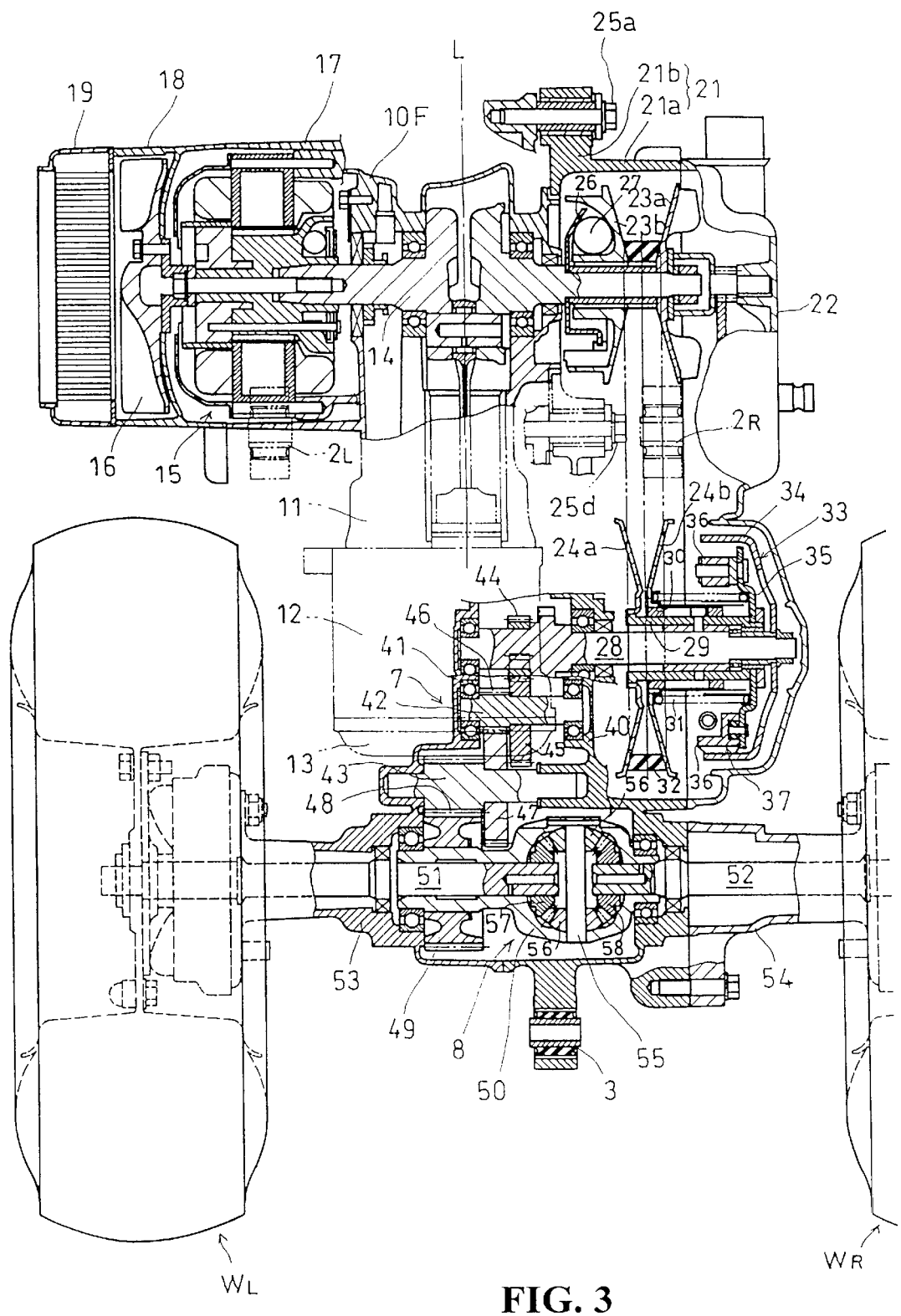
FIG. 3 is a cross section taken along the line III—III in FIG. 2.

As shown in FIG. 2 which is a right side view of the power unit 1 in the condition where a transmission case cover 22 is removed and FIG. 3 which is a cross section taken along the line III—III in FIG. 2, the power unit 1 includes an internal combustion engine 4 and a power transmitting device 5 for transmitting power from the engine 4 to axles 51 and 52 of the rear wheels $W_L$ and $W_R$. The power transmitting device 5 includes a V-belt type continuously variable transmission 6 and a speed reducing device having a speed reducing gear mechanism 7 and a differential mechanism 8. The transmission 6 is located on the right side of the engine 4.

The engine 4 is a spark-ignition, four-cycle, water-cooled, single-cylinder internal combustion engine. The engine 4 has a crankcase 10 composed of a front crankcase 10F and a rear crankcase 10R joined together along a plane substantially perpendicular to the axis L of a cylinder 11 and containing the axis of a crankshaft 14. The cylinder 11 is formed integrally with the rear crankcase 10R by casting. A cylinder head 12 is mounted on the cylinder 11, and a cylinder head cover 13 is mounted on the cylinder head 12, thus forming the cylinder portion.

The crankshaft 14 is rotatably mounted through a pair of main bearings to the crankcase 10. An alternator 15 is provided on a left end portion of the crankshaft 14 extending leftward through a left wall of the crankcase 10. A cooling fan 16 is fixed to a rotor of the alternator 15. An alternator case 17 for covering the alternator 15 is formed integrally with the crankcase 10 on the left side thereof by casting. The alternator case 17 has a left open end on which a fan cover 18 is mounted. A radiator 19 is mounted on the left side of the fan cover 18, and air is forcibly passed through the radiator 19 by the cooling fan 16. On the other hand, a drive pulley 23 of the transmission 6 is provided on a right end portion of the crankshaft 14 extending rightward through a right wall of the crankcase 10.

The axis L of the cylinder 11, or the axis L of the cylinder position extends in the longitudinal direction of the vehicle body and is inclined slightly upward, e.g., at an angle of about 10° with respect to a horizontal line extending rearward from the intersection between the axis L of the cylinder 11 and the axis of the crankshaft 14 in perpendicular relationship to the axis of the crankshaft 14. The right portions of the cylinder 11, the cylinder head 12, and the cylinder head cover 13 are located above a speed reducing device case cover 41 to be hereinafter described so as to be overlapped in the vertical direction.

Although not shown, the cylinder head 12 is provided with an intake valve and an exhaust valve. A camshaft having cams for opening the intake valve and the exhaust valve is rotatably mounted on the cylinder head 12. The camshaft is driven by the crankshaft 14 through a timing chain. A carburetor 20 is connected to one end of an intake pipe, and an intake port 12a is connected to the other end of the intake pipe. An exhaust port 12b is connected to an exhaust pipe (not shown).

The transmission 6 located on the right side of the engine 4 has a drive pulley 23 and a driven pulley 24 accommodated in a chamber defined by a transmission case 21 and a transmission case cover 22. The transmission case 21 has a peripheral wall 21a and a bottom wall 21b opposed to the right wall of the crankcase 10. The transmission case cover 22 is located so as to cover a right open end of the transmission case 21.

The transmission case 21 and the engine 4 are joined together by four bolts 25a, 25b, 25c, and 25d spaced radially from the drive pulley 23 and spaced circumferentially from each other in such a manner that a cylindrical projection formed on the right wall of the crankcase 10 is engaged with a hole formed through the bottom wall 21b of the transmission case 21 and that the transmission case 21 and the engine 4 are joined substantially along a vertical plane containing a laterally central line of the vehicle.

More specifically, the engine 4 and the transmission case 21 are joined by the bolts 25a and 25b on the front side of the drive pulley 23 at two boss portions formed at a front end of the right wall of the front crankcase 10F and located above and below a first plane P1 containing the axis of the crankshaft 14 and the axis of an output shaft 28 of the transmission 6 and at two boss portions formed outside of the peripheral wall 21a of the transmission case 21 and opposed respectively to the two boss positions of the front crankcase 10F.

Furthermore, the engine 4 and the transmission case 21 are also joined by the bolts 25c and 25d on the rear side of the drive pulley 23 at a boss portion formed on the right wall of the rear crankcase 10 R and located below the first plane P1, at a boss portion formed on the bottom wall 21b of the transmission case 21 and opposed to the boss portion of the rear crankcase 10R, at a boss portion formed on an upper side wall of the cylinder 11 and located above the first plane P1, and at a boss portion formed on the bottom wall 21b of the transmission case 21 and opposed to the boss portion of the cylinder 11. Thus, the cylinder 11 is joined at its boss portion on the upper side wall to the transmission case 21, so that the cylinder 11 is reinforced at his joined portion, thereby increasing the rigidity of the cylinder 11.

The drive pulley 23 of the transmission 6 has a fixed pulley member 23a fixed near the right end of the crankshaft 14 and a movable pulley member 23b slidable in the axial direction of the crankshaft 14. A ramp plate 26 is fixed to the crankshaft 14 at a position between the bottom wall 21b of the transmission case 21 and the movable pulley member 23b, and a plurality of centrifugal weights 27 are radially movably accommodated in a space between the ramp plate 26 and the movable pulley member 23b.

The driven pulley 24 has a fixed pulley member 24a and a movable pulley member 24b. The fixed pulley member 24a is fixed to an inner sleeve 29 rotatably supported through a bearing to an output shaft 28 located on the rear lower side of the crankshaft 14 and having an axis parallel to the axis of the crankshaft 14. The movable pulley member 24b is fixed to an outer sleeve 30 axially slidably engaged with the outer circumference of the inner sleeve 29. The movable pulley member 24b is biased toward the fixedly pulley member 24a by a spring 31.

A V-belt 32 is wrapped between the drive pulley 23 and the driven pulley 24 so as to be held between the opposed conical surfaces of the fixed pulley member 23a and the movable pulley member 23b of the drive pulley 23 and between the opposed conical surfaces of the fixed pulley member 24a and the movable pulley member 24b of the driven pulley 24.

A centrifugal starting clutch 33 is provided on a right end portion of the output shaft 28. The starting clutch 33 has a cylindrical outer member 34 having a closed bottom fixed to the output shaft 28, and a drive plate 35 provided inside the outer member 34 and fixed to the inner sleeve 29. A plurality of clutch shoes 36 are pivotably supported to pins fixed to the drive plate 35 in such a manner that when the inner sleeve 29 is rotated at a speed higher than a preset speed, the clutch shoes 36 are pivotally moved in a radially outward direction by a centrifugal force, so that frictional members provided on the outer circumferences of the clutch shoes 36 come into contact with the inner circumferential surface of the outer member 34, thereby obtaining an engaged condition of the starting clutch 33.

With this structure, the transmission 6 is operated in the following manner. When the engine speed is low, the movable pulley member 23b of the drive pulley 23 is axially spaced away from the fixed pulley member 23a of the drive pulley 23, so that the effective wrap radius of the V-belt 32 on the drive pulley 23 is small, whereas the movable pulley member 24b of the driven pulley 24 is biased by the spring 31 to have an axial position close to the fixed pulley member 24a of the driven pulley 24, so that the effective wrap radius of the V-belt 32 on the driven pulley 24 is maintained large, thereby transmitting the rotation of the crankshaft 14 to the output shaft 28 with a large reduction ratio.

When the engine speed is increased, the centrifugal weights 27 are moved radially outward to axially move the movable pulley member 23b of the drive pulley 23 toward the fixed pulley member 23a, so that the effective wrap radius of the V-belt 32 on the drive pulley 23 is increased, whereas the movable pulley member 24b of the driven pulley 24 is moved away from the fixed pulley member 24a against the spring 31, so that the effective wrap radius of the V-belt 32 on the driven pulley 24 is decreased, thereby obtaining a small reduction ratio.

Figure 4:
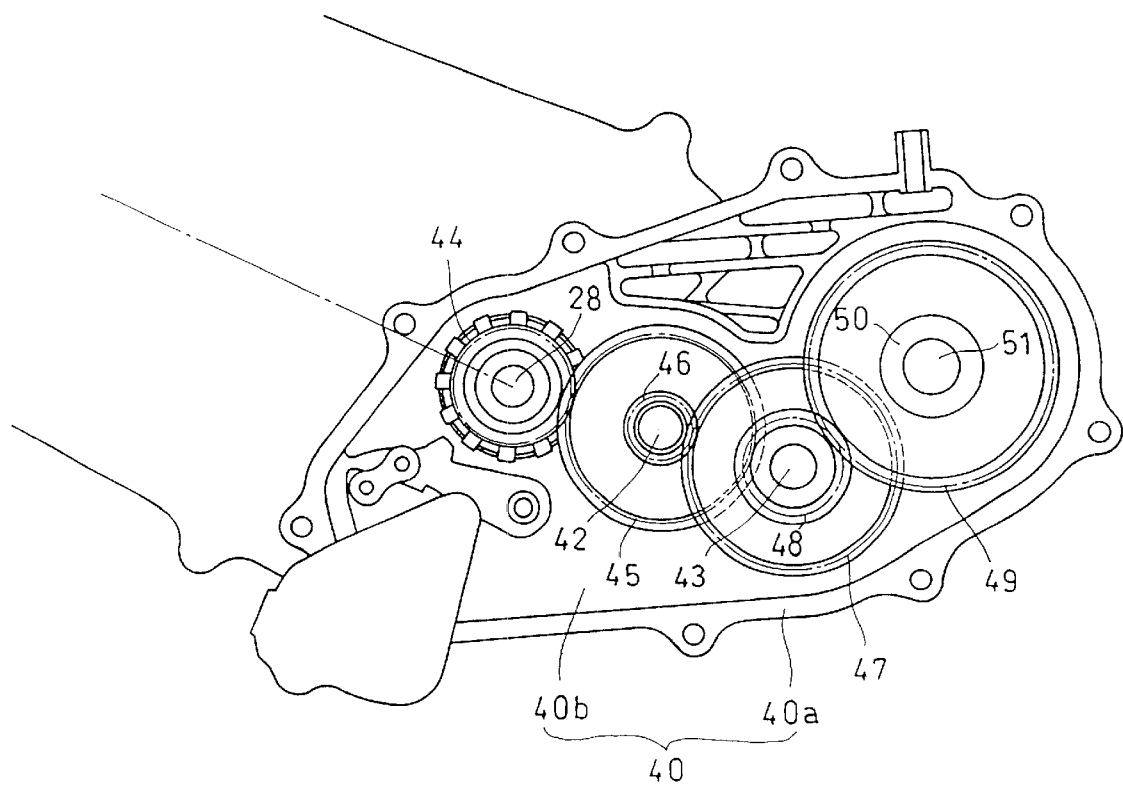
FIG. 4 is a left side view of a speed reducing device case of the vehicle power unit when a speed reducing device case cover is removed.

As shown in FIG. 3 and FIG. 4 which is a left side view of a speed reducing device case 40 in the condition where a speed reducing device case cover 41 is removed, the speed reducing device case 40 is located on the rear side of the transmission case 21 and is formed integrally with the transmission case 21. In a chamber defined between the speed reducing device case 40 and the speed reducing device case cover 41, there are accommodated a left end portion of the output shaft 28 extending leftward through the bottom wall 21b of the transmission case 21, the speed reducing gear mechanism 7 for reducing the rotational speed of the output shaft 28, and the differential mechanism 8. A part of a bottom wall 40b of the speed reducing device case 40 is commonly used as the bottom wall 21b of the transmission case 21.

An upper portion of a peripheral wall 40a of the speed reducing device case 40 and an upper portion of the speed reducing device case cover 41 are gradually inclined downward from the rear side toward the front side, and a radial distance from the axis of the output shaft 28 to this inclined portion is set smaller than the radius of the driven pulley 24, thereby avoiding interference with the cylinder portion extending longitudinally and allowing the cylinder portion to be located on the left side of the bottom wall 21b of the transmission case 21 in adjacent relationship thereto. Furthermore, the cylinder portion is inclined down toward the rear side, and the speed reducing device case cover 41 and the cylinder portion are vertically overlapped. Thus, the vertical and longitudinal sizes of the power unit 1 can be reduced.

Two axially spaced positions of the left end portion of the output shaft 28 of the transmission 6, the opposite ends of a first intermediate shaft 42, and the opposite ends of a second intermediate shaft 43 are rotatably supported to the bottom wall 40b of the speed reducing device case 40 and the speed reducing device case cover 41. Furthermore, the opposite ends of a differential carrier 50 of the differential mechanism 8 located in the speed reducing device case 40 and on the rear side of the transmission case 21 are rotatably supported to the bottom wall 40b of the speed reducing device case 40 and the speed reducing device case cover 41. A part of the cross section of the speed reducing gear mechanism 7 shown in FIG. 3 appears as a cross section taken along a line connecting the axes of the first and second intermediate shafts 42 and 43 and the axis of the left rear axle 51.

The output shaft 28 is geared through the first and second intermediate shafts 42 and 43 to the differential carrier 50 of the differential mechanism 8. More specifically, the first intermediate shaft 42 is provided with a small-diameter gear 46 and a large-diameter gear 45, and the second intermediate shaft 43 is provided with a small-diameter gear 48 and a large-diameter gear 47. The output shaft 28 is provided with a small-diameter output gear 44. The differential carrier 50 is provided with a large-diameter final gear 49. The output gear 44 of the output shaft 28 is in mesh with the large-diameter gear 45 of the first intermediate shaft 42. The small-diameter gear 46 of the first intermediate shaft 42 is in mesh with the large-diameter gear 47 of the second intermediate shaft 43. The small-diameter gear 48 of the second intermediate shaft 43 is in mesh with the final gear 49 of the differential carrier 50. With this structure of the speed reducing gear mechanism 7, the rotational speed of the output shaft 28 is reduced in a three-step manner and transmitted to the differential carrier 50 of the differential mechanism 8.

The speed reducing device case cover 41 is integrally formed with a left axle tube 53 for accommodating the left rear axle 51 of the left rear wheel $W_L$. The left rear axle 51 extends through the differential carrier 50. On the other hand, a right axle tube 54 for accommodating the right rear axle 52 of the right rear wheel $W_R$ is bolted to a right opening end formed on a part of the bottom wall 40b of the speed reducing device case 40 where the differential mechanism 8 is accommodated.

The differential mechanism 8 includes a pinion shaft 55 extending through the differential carrier 50 and supported thereto, a pair of pinion gears 56 fixed to the opposite ends of the pinion shaft 55, and a pair of left and right side gears 57 and 58 meshing with the pinion gears 56. The left and right rear axles 51 and 52 are fixed to the left and right side gears 57 and 58, respectively. Accordingly, the rotation of the differential carrier 50 is distributed at an appropriate speed ratio by the mesh of the pinion gears 56 and the side gears 57 and 58, and equal drive forces are transmitted to the left and right rear axles 51 and 52.

Thus, the power from the crankshaft 14 is input into the drive pulley 23 of the transmission 6, and is then transmitted to the driven pulley 24 with the rotational speed being changed at a ratio according to engine speed by the transmission 6. The power transmitted to the driven pulley 24 is further transmitted through the starting clutch 33 to the output shaft 28. The output from the transmission 6 is transmitted through the speed reducing device having the speed reducing gear mechanism 7 and the differential mechanism 8 to the left and right rear wheels $W_L$ and $W_R$.

As shown in FIGS. 2 and 3, the power unit 1 is supported to the frame F of the vehicle body (see FIG. 1) at the two front pivot portions $2_L$ and $2_R$ and the one rear pivot portion 3.

More specifically, the right front pivot portion $2_R$ is provided by a tubular bushing having a cylindrical elastic member. The axis of this tubular bushing is located on the rear side of the crankshaft 14 at a position near the open end of the peripheral wall 21a of the transmission case 21 and just over the boss portions through which the bolt 25d is inserted between the cylinder 11 and the transmission case 21. The right front pivot portion $2_R$ is provided on a bracket projecting upward from the peripheral wall 21a of the transmission case 21.

Similarly, the left front pivot portion $2_L$ is provided by a tubular bushing having a cylindrical elastic member, which is provided on a bracket projecting upward from an upper side wall of the alternator case 17. As shown in FIG. 3, the left front pivot portion $2_L$ is located in symmetrical relationship to the right front pivot portion $2_R$ with respect to the axis L of the cylinder 11.

The rear pivot portion 3 of the power unit 1 is provided by a tubular bushing having a cylindrical elastic member, which is provided on a bracket projecting rearward from the rear end of the speed reducing device case 40. The axis of the rear pivot portion 3 lies on a horizontal plane containing the axes of the left and right rear axles 51 and 52 of the left and right rear wheels $W_L$ and $W_R$, and the laterally central point of the rear pivot portion 3 lies on a vertical plane containing the laterally central line of the vehicle body.

The positional relation between the pivot portions, the shafts, and the cylinder portion will now be described with reference to FIG. 2.

A second plane P2 containing the axes of the front pivot portions $2_L$ and $2_R$ and the axis of the rear pivot portion 3 is located above the crankshaft 14 and the left and right rear axles 51 and 52. Furthermore, the second plane P2 intersects the cylinder portion having an axis L inclined upward toward the rear side between the front pivot portions $2_L$ and $2_R$ and the rear pivot portion 3 as viewed in side elevation.

In particular, as viewed in side elevation, the area of a part of the cylinder portion below the second plane P2, which part is a fixed end portion near the connected portion between the engine 4 and the transmission case 21, is set larger than the area of the remaining part of the cylinder portion above the second plane P2, which part is a free end portion. Accordingly, the free end portion which is more likely to vibrate is less spaced from the second plane P2.

The crankshaft 14 is located on the front and upper side of the left and right rear axles 51 and 52 and the output shaft 28. The output shaft 28 is located on the front side of the rear axles 51 and 52 and below a third plane P3 containing the axes of the rear axles 51 and 52 and the axis of the crankshaft 14. The axes of the first and second intermediate shafts 42 and 43 are located on the rear and lower side of the axis of the output shaft 28. The output shaft 28 and the first and second intermediate shafts 42 and 43 are located below the third plane P3.

The following effects can be exhibited by the above-mentioned configuration of the preferred embodiment. The second plane P2 is located above the crankshaft 14 and the rear axles 51 and 52, and the second plane P2 intersects the cylinder portion whose axis L is inclined down toward the rear side from the vertical direction between the front pivot portions $2_L$ and $2_R$ and the rear pivot portion 3 as viewed in side elevation. With this arrangement, the amount of upward projection of the cylinder portion from the second plane P2 can be reduced.

As a result, it is possible to reduce the moment of inertia of the cylinder portion about a straight line lying on the second plane P2 and connecting the laterally central point between the front pivot portions $2_L$ and $2_R$ and the laterally central point of the rear pivot portion 3, so that the moment acting on the front pivot portions $2_L$ and $2_R$ and the rear pivot portion 3 due to vibrations of the cylinder portion by the combustion in the engine 4 can be reduced. Accordingly, vibrations of the power unit 1 including the cylinder portion can be suppressed to thereby suppress the generation of noise.

In particular, the area of a part of the cylinder portion below the second plane P2 which part is a fixed end portion is set larger than the area of the remaining part of the cylinder portion above the second plane P2 which part is a free end portion as viewed in side elevation, so that the free end portion which is more likely to vibrate is less spaced from the second plane P2. With this arrangement, the moment of inertia about the above-mentioned straight line can be reduced to thereby suppress vibrations.

The output shaft 28 of the transmission 6 and the first and second intermediate shafts 42 and 43 are located below the third plane P3. Accordingly, it is possible to avoid the interference of these shafts 28, 42, and 43 with the cylinder head 12 located above the left end portion of the output shaft 28 and the first intermediate shaft 42 so as to be vertically overlapped. Furthermore, it is also possible to avoid the interference of the speed reducing device case cover 41 with the cylinder 11, the cylinder head 12, and the cylinder head cover 13 located above the speed reducing device case cover 41 so as to be vertically overlapped. Thus, the cylinder portion can be largely inclined down to the rear side from the vertical direction.

As a result, it is possible to increase the degree of freedom of tilt arrangement of the cylinder portion for reducing the amount of upward projection of the cylinder portion from the second plane P2. Accordingly, optimum arrangement of the cylinder portion with respect to the second plane P2 is allowed from the viewpoint of suppression of vibrations of the power unit 1.

Furthermore, the cylinder portion largely inclined down from the vertical direction is located above the speed reducing device case cover 41 inside which the left end portion of the output shaft 28 of the transmission 6 and the first intermediate shaft 42 are accommodated so as to be overlapped in the vertical direction. Accordingly, the vertical and longitudinal sizes of the power unit 1 can be reduced.

In addition, the starting clutch 33 having a large diameter is located on the right side of the transmission 6 opposite to the speed reducing device which is located on the left side of the transmission 6. Accordingly, it is possible to avoid the interference of the starting clutch 33 with the cylinder portion of the engine 4 located on the left side of the transmission 6. Also from this point of view, the power unit 1 can be made compact.

The cylinder 11 is joined at its boss portion on the upper side wall to the transmission case 21, thereby increasing the rigidity of the cylinder 11. With this structure, vibrations of the cylinder portion including the cylinder 11 can be suppressed to thereby effect noise suppression.

The above-mentioned configuration of the preferred embodiment may be partially modified as follows:

While the cylinder head 12 as a part of the cylinder portion is located above the left end portion of the output shaft 28 so as to be vertically overlapped in the above preferred embodiment, the cylinder 11 or the cylinder head cover 13 may be located above the left end portion of the output shaft 28 so as to be vertically overlapped. Furthermore, while the cylinder portion is composed of the cylinder 11, the cylinder head 12, and the cylinder head cover 13 in the above preferred embodiment, the cylinder portion may be composed of a cylinder and a cylinder head.

While the cylinder portion is located above the speed reducing device case cover 41 in the above preferred embodiment, the cylinder portion may be located above the speed reducing device case 40 in the case where the speed reducing device case 40 is further extended leftward.

While the three-wheeled automotive vehicle is employed as the vehicle in the above preferred embodiment, a two-wheeled automotive vehicle or a four-wheeled automotive vehicle may also be employed as the vehicle in the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle power unit, comprising:
   an internal combustion engine having a crankshaft for extending in a lateral direction of a vehicle body and a cylinder portion having an axis inclined down to a rear side from a vertical direction;
   a power transmitting device for transmitting power of said internal combustion engine to a rear wheel located behind said crankshaft;
   said vehicle power unit being supported to said vehicle body at a front pivot portion and a rear pivot portion spaced from each other in a longitudinal direction of the vehicle body so as to be vertically swingable about said front pivot portion;
   wherein said crankshaft and an axle of said rear wheel are located below a plane containing the axes of said front pivot portion and said rear pivot portion, and said plane and said cylinder portion intersect each other between said front pivot portion and said rear pivot portion as viewed in side elevation, and
   wherein said front pivot portion is located upward of said cylinder portion so as to be vertically overlapped.

2. The vehicle power unit according to claim 1, wherein said power transmitting device includes a transmission having an output shaft geared to said axle of said rear wheel, said output shaft being located below a part of said cylinder portion so as to be vertically overlapped and below a plane containing an axis of said crankshaft and an axis of said axle of said rear wheel.

3. The vehicle power unit according to claim 2, wherein the output shaft is located on a front side of the axis of the axle of the rear wheel and below a plane containing the axis of the axle of the rear wheel and an axis of said crankshaft.

4. The vehicle power unit according to claim 3, further comprising first and second intermediate shafts and the output shaft, and wherein said first and second intermediate shafts are located on a rear, lower side of an axis of the output shaft.

5. The vehicle power unit according to claim 1, wherein a fixed end portion of the cylinder portion located below said plane is larger than a free end portion of the cylinder portion located above said plane.

6. A vehicle, comprising:
   a vehicle body having a rear wheel mounted for rotation thereto; and
   a vehicle power unit, said vehicle power unit including:
      an internal combustion engine having a crankshaft extending in a lateral direction of said vehicle body and a cylinder portion having an axis inclined down to a rear side from a vertical direction;
      a power transmitting device for transmitting power of said internal combustion engine to said rear wheel located behind said crankshaft;
      said vehicle power unit being supported to said vehicle body at a front pivot portion and a rear pivot portion spaced from each other in a longitudinal direction of said vehicle body so as to be vertically swingable about said front pivot portion;
      wherein said crankshaft and an axle of said rear wheel are located below a plane containing the axes of said front pivot portion and said rear pivot portion, and said plane and said cylinder portion intersect each other between said front pivot portion and said rear pivot portion as viewed in side elevation, and
      wherein said front pivot portion is located upward of said cylinder portion so as to be vertically overlapped.

7. The vehicle according to claim 6, wherein said power transmitting device includes a transmission having an output shaft geared to said axle of said rear wheel, said output shaft being located below a part of said cylinder portion so as to be vertically overlapped and below a plane containing an axis of said crankshaft and an axis of said axle of said rear wheel.

8. The vehicle according to claim 7, wherein the output shaft is located on a front side of the axis of the axle of the rear wheel and below a plane containing the axis of the axle of the rear wheel and an axis of said crankshaft.

9. The vehicle according to claim 8, further comprising first and second intermediate shafts and the output shaft, and wherein said first and second intermediate shafts are located on a rear, lower side of an axis of the output shaft.

10. The vehicle power unit according to claim 6, wherein a fixed end portion of the cylinder portion located below said plane is larger than a free end portion of the cylinder portion located above said plane.

* * * * *